2,953,609
PREPARATION OF SUBSTITUTED TETRAHYDRO-
INDENOINDENE

Francis T. Wadsworth, Dickinson, and Leon M. Adams, La Marque, Tex., assignors to The American Oil Company, Texas City, Tex., a corporation of Texas No Drawing. Filed Apr. 29, 1958, Ser. No. 731,624

6 Claims. (Cl. 260—668)

This invention concerns the properation of substituted tetrahydroindenoindene, and particularly concerns the preparation of 4b,9,9,10,10 - pentamethyl - 4b,9,9a,10-tetrahydroindeno[1,2-a]indene.

This compound may be chlorinated to produce a compound having as much as 50 weight percent chlorine which may then be used as an insecticide or herbicide. Sulfurization of the indenoindene may be employed to produce high surfur content extreme pressure lubricating oil additives. The indenoindene also finds additional utility as intermediates in the conversion thereof to carboxylic acids, alcohols, etc.

It has been found that when 1,3,3-trimethyl-1-phenylindan is contacted with a Friedel-Crafts catalyst such as aluminum chloride at temperatures below about 150° C., 4b,9,9,10,10 - pentamethyl - 4b,9,9a,10 - tetrahydroindeno[1,2-a]indene is produced together wtih benzene. The reaction is conveniently carried out at temperatures as low as about 25° C. and preferably at temperatures between about 75° and 100° C., using contacting times at the latter temperatures of 1 to 10 hours. A solvent such as benzene may advantageously be added in the reaction, and is particularly beneficial in working up the products. Material which is lower and/or higher boiling than the desired indenoindene can be recycled for conversion to the indenoindene.

The 1,3,3-trimethyl-1-phenylindan, which may conveniently be prepared by contacting alpha-methylstyrene with an acid catalyst at elevated temperatures such as above 100° C. to convert it to the saturated cyclic dimer, is employed as the reactant in this process. In the present process the 1,3,3-trimethyl-1-phenylindan is converted to 4b,9,9,10,10-pentamethyl-4b,9,9a,10-tetrahydroindeno[1,2-a]indene and benzene according to the following simplified chemical reaction:

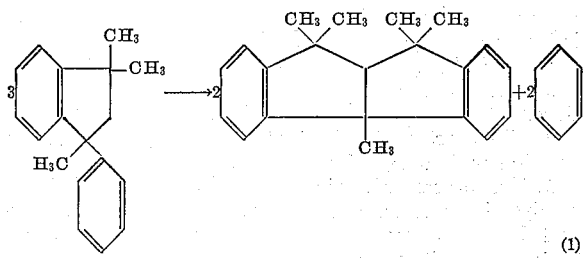

(1)

The above reaction has been simplified to indicate the structure of the reactant and products. It is believed that the reaction proceeds according to the following mechanism, but we do not wish to be bound thereby:

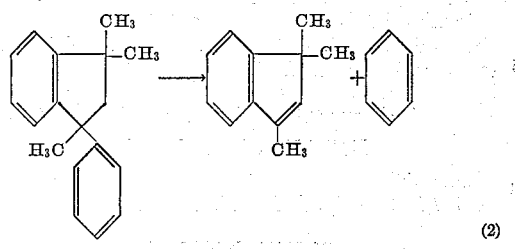

(2)

Evidence for this reaction has been established by the isolation of both benzene and trimethylindene from the reaction mixture. The next step in the reaction scheme is postulated as follows:

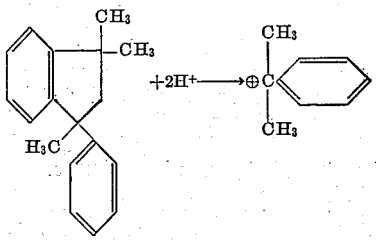

(3)

Evidence of this reaction is indicated by the presence of cumene in the reaction mixture. The cumylcarbonium ion appears to react with the trimethylindene according to the following reaction:

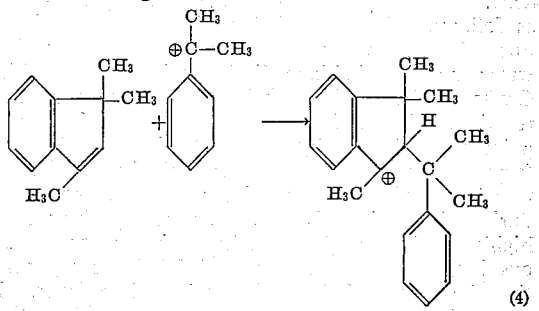

(4)

The production of Reaction 4 then cyclizes as follows:

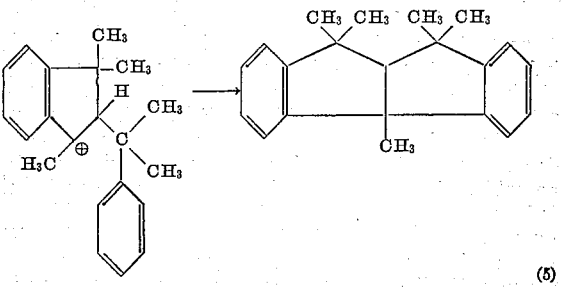

(5)

In carrying out the reactions, the 1,3,3-trimethyl-1-phenylindan is introduced into the reaction zone wherein it is contacted with a Friedel-Crafts catalyst. Aluminum chloride is a particularly useful Friedel-Crafts catalyst for the reaction but other Friedel-Crafts metal halides such as aluminum bromide, boron fluoride, stannic chloride, and titanium chloride may be used. The amount of Friedel-Crafts metal halide employed may vary considerably, but between 5 to 50 weight percent of the catalyst based upon 1,3,3-trimethyl-1-phenylindan (this latter compound will hereinafter be referred to as the saturated alpha-methylstyrene dimer) may be used. Usually between 10 to 20 weight percent of aluminum chloride based upon the alpha-methylstyrene is quite satisfactory. The reaction is carried out at temperatures between 25° and 150° C. preferably at a temperature between 75° and 100° C. At this latter range of reaction temperatures a reaction time of between 1 to 10 hours will be satisfactory. In general, the higher the temperature the shorter will be the necessary reaction time for completion of the reaction. Thus at 100° C. a reaction time of 2 to 3 hours is sufficient and at temperatures of 125° to 150° C. the reaction time may be as short as 1 hour or even less. Reaction temperatures above 100° C. tend to cause decomposition of the 4b,9,9,10,10 - pentamethyl - 4b,9,9a,10 - tetrahydroindeno[1,2-a]indene (this compound will hereinafter be referred to as the indenoindene) to produce undesired polymers.

Although benzene is formed in the reaction, it is nevertheless preferred to add a nonreactive solvent to the reaction zone to prevent the reaction mixture from becoming unduly viscous and difficult to handle. Benzene is a particularly suitable solvent to use since it is produced in the reaction and is not subject to chemical reactions such as might occur when using substituted aromatics such as xylenes or similar materials which would tend to disproportionate and possibly interact with the reactants in the presence of the Friedel-Crafts catalyst. The amount of nonreactive solvent which may be used may be varied considerably in order to obtain the desired viscosity of the reaction mixture. It may suitably be within the range of 0.1 to 1 or more volumes per volume of the alphamethylstyrene dimer.

After the reaction has been completed, the reaction mixture may then be processed to remove the Friedel-Crafts metal halides. Thereafter the hydrocarbon products may be worked up to recover the desired indenoindene. The recovery of the products may be carried out as follows. Upon completion of the reaction, the mixture of reaction products may be contacted with ice, water or other suitable media for hydrolyzing the Friedel-Crafts catalysts. If no solvent has been used in the reaction, it is especially advantageous to add one at this point to avoid highly stable emulsions which tend to form upon mixing of the water with the reaction products in the absence of a solvent. The use of a solvent during the hydrolysis step prevents the formation of highly stable emulsions. When using water, an aqueous layer of the hydrolyzed Friedel-Crafts catalyst can then be separated from the hydrocarbon layer. Benzene solvent and also the benzene produced by the reaction may then be distilled overhead together with the cumene which has also been formed by the reaction. A next higher boiling fraction which contains trimethyl indene and trimethylhydrindene together with unreacted alpha-methylstyrene dimer may be returned to the reaction zone for contact with the Friedel-Crafts catalysts whereby it is converted to further amounts of the indenoindene. The remaining bottoms material can then be subjected to a vacuum distillation step by which the indenoindene is concentrated in a fraction boiling between about 170° and 210° C. at 10 mm. Hg abs. The indenoindene may then be purified by dissolving the vacuum distillate in hot alcohol such as ethanol or isopropanol, and crystals of the desired indenoindene thereafter precipitate from the solution upon cooling. The undistilled material which boils higher than the indenoindene fraction may also, to our surprise, be recycled to the reaction zone for conversion to indenoindene.

The following examples are intended as illustrations of the invention without being limitations to its scope.

*Example 1*

Molten 1,3,3 - trimethyl - 1 - phenylindan was agitated with 20% by weight of aluminum chloride at 80° C. for about 24 hours. The reaction mixture was then cooled and hydrolyzed with ice water. Low boiling materials including benzene and cumene which were formed during the reaction were removed by steam distillation. Thereafter the non-volatilized portion was dissolved in benzene and washed with water. The benzene was removed by distillation and the residue distilled at 10 mm. Hg abs. A low boiling fraction, boiling between 80° and 83° C. at 10 mm. Hg abs. was recovered in the amount of 7.2 weight percent based on alpha-methylstyrene dimer charged. This fraction consisted principally of trimethylindene and trimethylhydrindene. A somewhat higher boiling fraction, boiling between 83° and 170° C. at 10 mm. Hg abs. was recovered in the amount of 20.5 weight percent on charge. This fraction was principally the saturated dimer of alpha-methylstyrene. A fraction boiling between 170° and 210° C. at 10 mm. Hg abs. was collected. This fraction consisted principally of indenoindene and constituted about 26.5 weight percent of the alpha-methylstyrene dimer charged to the reaction. A fraction boiling above the indenoindene fraction was recovered. This fraction boiled between 210° C. (at 10 mm. Hg abs.) and 209° C. (at 0.5 mm. Hg abs.). Approximately 8.1% by weight of the charge dimer was converted to this very viscous liquid fraction. The remaining undistilled material at 0.5 mm. Hg abs. appeared to be a dark brittle solid at room temperature and was produced in the amount of 13.4 weight percent based upon charged alpha-methylstyrene. The indenoindene fraction was dissolved in hot isopropanol, and then crystallized therefrom by cooling. The crystals were analyzed and found to have a melting point of 132° C., a molecular weight of 276, a boiling point at 756 mm. Hg abs. of 329° C. 4b,9,9,10,10 - pentamethyl - 4b,9,9a,10 - tetrahydroindeno[1,2-a]indene was also prepared according to the technique of Barnes and Beitchman, J.A.C.S. 76, p. 5430 (1954). The indenoindene compound prepared according to this reference was found to have the same melting point and infrared spectrum as that prepared in accordance with our above example.

*Example 2*

The post indenoindene fraction which boiled between 210° C. (at 10 mm. Hg abs.) and 209° C. (at 0.5 mm. Hg abs.) was agitated with 20% by weight of aluminum chloride at 100° C. for about 3 hours. Thereafter the product was worked up in accordance with the previous example. Based upon the charge to this experiment approximately 40% by weight was converted to 4b,9,9,10,10 - pentamethyl - 4b,9,9a,10 - tetrahydroindeno[1,2-a]indene.

While the invention has been described with reference to certain examples, it is obvious that other conditions, catalysts etc. may be employed by those skilled in the art without departing from the scope of the invention.

What is claimed is:

1. A process for producing 4b,9,9,10,10-pentamethyl-4b,9,9a,10 - tetrahydroindeno[1,2-a]indene which comprises contacting 1,3,3 - trimethyl - 1 - phenylindan with a Friedel-Crafts metal halide catalyst at a temperature between about 25° and 150° C. and forming 4b,9,9,10,10 - pentamethyl - 4b,9,9a,10 - tetrahydroindeno[1,2 - a]indene plus benzene, and recovering said 4b,9,9,10,10-pentamethyl - 4b,9,9a,10 - tetrahydroindeno[1,2 - a]indene from the products of the reaction.

2. The process of claim 1 wherein the 1,3,3-trimethyl-1-phenylindan is contacted with between 5 and 50% of aluminum chloride based on 1,3,3-trimethyl-1-phenylindan at a temperature between about 75° and 100° C. for a time between 1 to 10 hours.

3. The process of claim 1 wherein benzene is introduced into the contacting step.

4. The process of claim 3 wherein the products of the reaction are hydrolyzed with water.

5. The process of claim 1 wherein the Friedel-Crafts catalyst is removed from the products of the reaction and the hydrocarbon products are fractionated to recover a fraction boiling between about 80° and 170° C. at 10 mm. Hg abs. which is recycled to the contacting step.

6. The process of claim 1 wherein the Friedel-Crafts catalyst is removed from the products of the reaction and the hydrocarbon products are fractionated to recover a fraction boiling between about 210° C. at 10 mm. Hg abs. and 209° C. at 0.5 mm. Hg abs. which is recycled to the contacting step.

References Cited in the file of this patent

UNITED STATES PATENTS

| | | |
|---|---|---|
| 2,526,897 | Ipatieff et al. | Oct. 24, 1950 |
| 2,587,588 | Ipatieff et al. | Mar. 4, 1952 |

OTHER REFERENCES

Barnes et al.: Journal of the American Chemical Society, vol. 76, pages 5430–33.